(12) United States Patent
Chaturvedi et al.

(10) Patent No.: US 12,406,252 B2
(45) Date of Patent: Sep. 2, 2025

(54) SYSTEMS AND METHODS FOR INTEGRATED DIGITAL WALLET PAYMENTS

(71) Applicant: JPMORGAN CHASE BANK, N.A., New York, NY (US)

(72) Inventors: Niren Chaturvedi, Coppell, TX (US); Milena Shishkova, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 119 days.

(21) Appl. No.: 18/050,003

(22) Filed: Oct. 26, 2022

(65) Prior Publication Data

US 2024/0144247 A1  May 2, 2024

(51) Int. Cl.
*G06Q 20/36* (2012.01)
*G06Q 20/40* (2012.01)

(52) U.S. Cl.
CPC ... *G06Q 20/3674* (2013.01); *G06Q 20/40145* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 8,172,132 | B2 * | 5/2012 | Love | G06Q 20/382 705/79 |
| 10,546,289 | B1 * | 1/2020 | Maeng | G06Q 20/36 |
| 2010/0241571 | A1 * | 9/2010 | McDonald | G06Q 20/3821 705/26.1 |
| 2017/0111175 | A1 * | 4/2017 | Oberhauser | G06Q 20/38215 |
| 2018/0018660 | A1 * | 1/2018 | Gomes | G06Q 20/3678 |
| 2019/0102775 | A1 * | 4/2019 | Koeppel | G06Q 30/0226 |
| 2019/0164166 | A1 * | 5/2019 | Kinch | G06Q 20/4018 |
| 2019/0362339 | A1 * | 11/2019 | Gurunathan | G06Q 20/3674 |
| 2020/0097959 | A1 * | 3/2020 | Tran | G06Q 20/127 |
| 2020/0380495 | A1 * | 12/2020 | Kang | G06Q 20/3278 |
| 2021/0065176 | A1 * | 3/2021 | Ortiz | G06Q 20/322 |
| 2021/0351935 | A1 * | 11/2021 | Mishra | G06F 21/31 |
| 2021/0406904 | A1 * | 12/2021 | Ravinathan | G06Q 20/40145 |

(Continued)

OTHER PUBLICATIONS

Sovrin Foundation, "Sovereign Identity and Decentralized trust," retrieved from https://sovrin.org/wp-content/uploads/Sovrin-Protocol-and-Token-White-Paper.pdf, 2018, (Year: 2018).*

(Continued)

*Primary Examiner* — Eduardo Castilho
(74) *Attorney, Agent, or Firm* — GREENBERG TRAURIG LLP

(57) ABSTRACT

Systems and methods for integrated digital wallet payments are disclosed. Embodiments may store and manage the lifecycle of assets in a digital wallet and may provide artificial intelligence and/or machine learning based recommendations to provide the optimal frictionless and rewarding consumer authentication and payment experience. Embodiments may leverage blockchain technology that provides a single consumer solution with decentralized wallet ownership and a data-driven network orchestration for optimal payments. Embodiments securely store the payment instruments and may provide personal usage recommendations for the optimal outcome based on, for example, consumer preferences.

12 Claims, 7 Drawing Sheets

(56) References Cited

U.S. PATENT DOCUMENTS

| | | | |
|---|---|---|---|
| 2022/0029825 A1* | 1/2022 | Uhr | H04L 9/3239 |
| 2023/0074653 A1* | 3/2023 | Mawson | G06Q 20/0855 |
| 2023/0185894 A1* | 6/2023 | Sorensen | G06F 21/44 |
| | | | 726/7 |
| 2023/0316261 A1* | 10/2023 | Agbamu | G06Q 20/363 |
| | | | 705/67 |
| 2024/0029061 A1* | 1/2024 | Reed | G06Q 20/3825 |

OTHER PUBLICATIONS

H. Siddiqui et al. "Credentials as a Service Providing Self Sovereign Identity as a Cloud Service Using Trusted Execution Environments," 2021 IEEE International Conference on Cloud Engineering (IC2E), San Francisco, CA, USA, 2021, pp. 210-216, doi: 10.1109/IC2E52221.2021.00036. (Year: 2021).*

H. Yildiz et al., "Connecting Self-Sovereign Identity with Federated and User-centric Identities via SAML Integration," 2021 IEEE Symposium on Computers and Communications (ISCC), Athens, Greece, 2021, pp. 1-7, doi: 10.1109/ISCC53001.2021.9631453. (Year: 2021).*

Z. A. Lux et al. "Distributed-Ledger-based Authentication with Decentralized Identifiers and Verifiable Credentials," 2020 2nd Conference on Blockchain Research & Applications for Innovative Networks and Services (BRAINS), Paris, France, 2020, pp. 71-78, doi: 10.1109/BRAINS49436.2020.9223292. (Year: 2020).*

\* cited by examiner

SYSTEMS AND METHODS FOR INTEGRATED DIGITAL WALLET PAYMENTS

BACKGROUND OF THE INVENTION

1. Field of the Invention

Embodiments are generally directed to systems and methods for integrated digital wallet payments.

2. Description of the Related Art

Recently, digital wallets have become very common. Digital wallets store digital versions of an individual's credit cards, debit cards, alternate payment methods, and even things like loyalty program memberships. When making a payment, the individual presents an electronic device, such as a smart phone, a smart watch, etc. to a point-of-sale device, selects a payment instrument, and completes the transaction.

SUMMARY OF THE INVENTION

Systems and methods for digital wallet payments are disclosed. In one embodiment, a method for registration and storage of a digital identify identifier may include: (1) receiving, at a digital wallet application executed by a user electronic device, authentication information for a user; (2) authenticating, by the digital wallet application, the authentication information; (3) creating, by the digital wallet application, a digital identity identifier for the user, wherein the digital identity identifier comprises user information for the user, the authentication information, and/or an attestation issued by an attestation issuing authority; (4) receiving, by the digital wallet application, information for a plurality of user payment mechanisms; and (5) receiving, by the digital wallet application, opt-in to automated rules-based payment mechanism selection.

In one embodiment, the authentication information may include a login credential, a passcode, a personal identification number, and/or biometric.

In one embodiment, the user information may include a user name and user contact information for the user.

In one embodiment, the method may also include storing, by the digital wallet application, the digital identity identifier in secure storage of the user electronic device.

In one embodiment, the method may also include submitting, by the digital wallet application, the digital identity identifier to a distributed ledger network, wherein the distributed ledger network is configured to write the digital identity identifier to a distributed ledger, wherein the digital wallet application receives a pointer to a location on the distributed ledger where the digital identity identifier is written.

In one embodiment, the payment mechanisms may be selected from the group consisting of a credit card, a debit card, a loyalty membership, and a cryptocurrency account.

In one embodiment, the automated rules-based payment mechanism selection may select the payment mechanism from the plurality of payment mechanisms to optimize a user transaction benefit.

In one embodiment, the automated rules-based payment mechanism selection may select the payment mechanism from the plurality of payment mechanisms based on a merchant type, a transaction amount, and a type of transaction.

According to another embodiment, a method for digital wallet payments may include: (1) receiving, by a digital wallet application executed by a user electronic device, a selection of a good or service offered by a merchant; (2) receiving, by the digital wallet application, authentication information from a user; (3) authenticating, by the digital wallet application, the authentication information; (4) selecting, by the digital wallet application, a payment mechanism out of a plurality of payment mechanisms onboarded to the digital wallet application; (5) retrieving, by the digital wallet application, a digital identity identifier for the user, wherein the digital identity identifier comprises a digital identity identifier token that is stored in secure storage of the user electronic device or a pointer to the digital identity identifier that is stored on a distributed ledger in a distributed ledger network; (5) communicating, by the digital wallet application, a payment token for the selected payment mechanism and the digital identity identifier token or the pointer to the digital identity identifier on the distributed ledger to a merchant payment system, wherein the merchant payment system is configured to generate a transaction authorization message and to communicate the transaction authorization message, the payment token, and the digital identity identifier token or the digital identity identifier pointer to an issuing financial institution backend over a payment network; (7) receiving, by the issuing financial institution backend, the transaction authorization message, the payment token, and the digital identity identifier token or the digital identity identifier pointer; (8) validating, by the issuing financial institution backend, the digital identity identifier token or the digital identity identifier pointer; (9) authorizing, by the issuing financial institution backend, the transaction authorization message; and (10) communicating, by the issuing financial institution, authorization to the merchant payment system.

In one embodiment, the authentication information may include a login credential, a passcode, a personal identification number, and/or biometric.

In one embodiment, the digital identity identifier may include user information for the user, the authentication information, and/or an attestation issued by an attestation issuing authority.

In one embodiment, the user information may include a user name and user contact information for the user.

In one embodiment, the digital wallet application may select the payment mechanism based on a merchant type, a transaction amount, and a type of transaction.

In one embodiment, the issuing financial institution backend may validate the digital identity identifier pointer by retrieving a stored digital identity identifier from the distributed ledger and comparing the digital identity identifier to a stored digital identity identifier.

In one embodiment, the issuing financial institution backend may validate the digital identity identifier token by retrieving a stored digital identity token and comparing the digital identity identifier token to a stored digital identity identifier token.

According to another embodiment, a method for digital wallet payments may include: (1) receiving, by a digital wallet application executed by a user electronic device, a selection of a good or service offered by a merchant; (2) receiving, by the digital wallet application, authentication information from a user; (3) authenticating, by the digital wallet application, the authentication information; (4) selecting, by the digital wallet application, a payment mechanism out of a plurality of payment mechanisms onboarded to the digital wallet application; (5) retrieving, by the digital wallet application, a digital identity identifier for the user, wherein the digital identity identifier comprises a digital identity identifier token that is stored in secure storage of the user electronic device or a pointer to the digital identity identifier that is stored on a distributed ledger in a distributed ledger network; (6) communicating, by the digital wallet application, a payment token for the selected payment mechanism to a merchant payment system, wherein the merchant payment system is configured to generate a transaction authorization message and to communicate the transaction authorization message and the payment token to an issuing financial institution backend over a payment network; (7) communicating, by the digital wallet application, the digital identity identifier token or the pointer to the digital identity identifier on the distributed ledger to the issuing financial institution backend over a payment network; (8) matching, by the issuing financial institution backend, the transaction authorization message and the payment token to the digital identity identifier token or the pointer to the digital identity identifier on the distributed ledger; (9) validating, by the issuing financial institution backend, the digital identity identifier token or the digital identity identifier pointer; (10) authorizing, by the issuing financial institution backend, the transaction authorization message; and (11) communicating, by the issuing financial institution, authorization to the merchant payment system.

In one embodiment, the authentication information may include a login credential, a passcode, a personal identification number, and/or biometric.

In one embodiment, the digital identity identifier may include user information for the user, the authentication information, and/or an attestation issued by an attestation issuing authority.

In one embodiment, the user information may include a user name and user contact information for the user.

In one embodiment, the digital wallet application may select the payment mechanism based on a merchant type, a transaction amount, and a type of transaction.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments generally relate to systems and methods for digital wallet payments.

Embodiments may store and manage the lifecycle of assets in the digital wallet and may provide artificial intelligence (AI) and/or machine learning (ML) based recommendations to provide the optimal frictionless and rewarding consumer authentication and payment experience.

Embodiments may leverage blockchain technology that provides a single consumer solution with decentralized wallet ownership and a data-driven network orchestration for optimal payments.

Embodiments may provide a digital wallet including an encrypted digital identity of the consumer (e.g., a personal ID, a driver's license, etc.), consumer payment instruments (e.g., global and local credit cards such as Visa, MasterCard, American Express; alternative payment mechanisms, such as ApplePay, GooglePay, Klarna, SEPA, iDeal, and Giro Pay, cryptocurrency assets, such as MyCrypto, MyEtherWallet, Revolut, and Coinbase, nonfungible tokens, etc. Embodiments may combine the identity and methods of payments into a streamlined payment experience.

Embodiments securely store the payment instruments and may provide personal usage recommendations for the optimal outcome based on, for example, consumer preferences.

Embodiments may provide merchants with a processor-agnostic integration that unlocks all payment instruments and recommendations. Embodiments may identify a payment method that provides the highest approval rate and greatest consumer retention, while optimizing the customer checkout experience.

Embodiments may decentralize wallet ownership, which increases consumer and merchant stickiness.

Embodiments may provide the consumer with full control, yet a no touch, no friction experience regardless of the merchant location, network, and payment provider, as well as security and traceability relying on the blockchain application technology.

Embodiments may provide the merchant with access to global consumers and networks via a single integration, no friction and guarantee conversion based on the consumer preferred payment instrument, without compromising security, traceability, and global anti-money laundering and combating the financing of terrorism practices.

Figure 1:
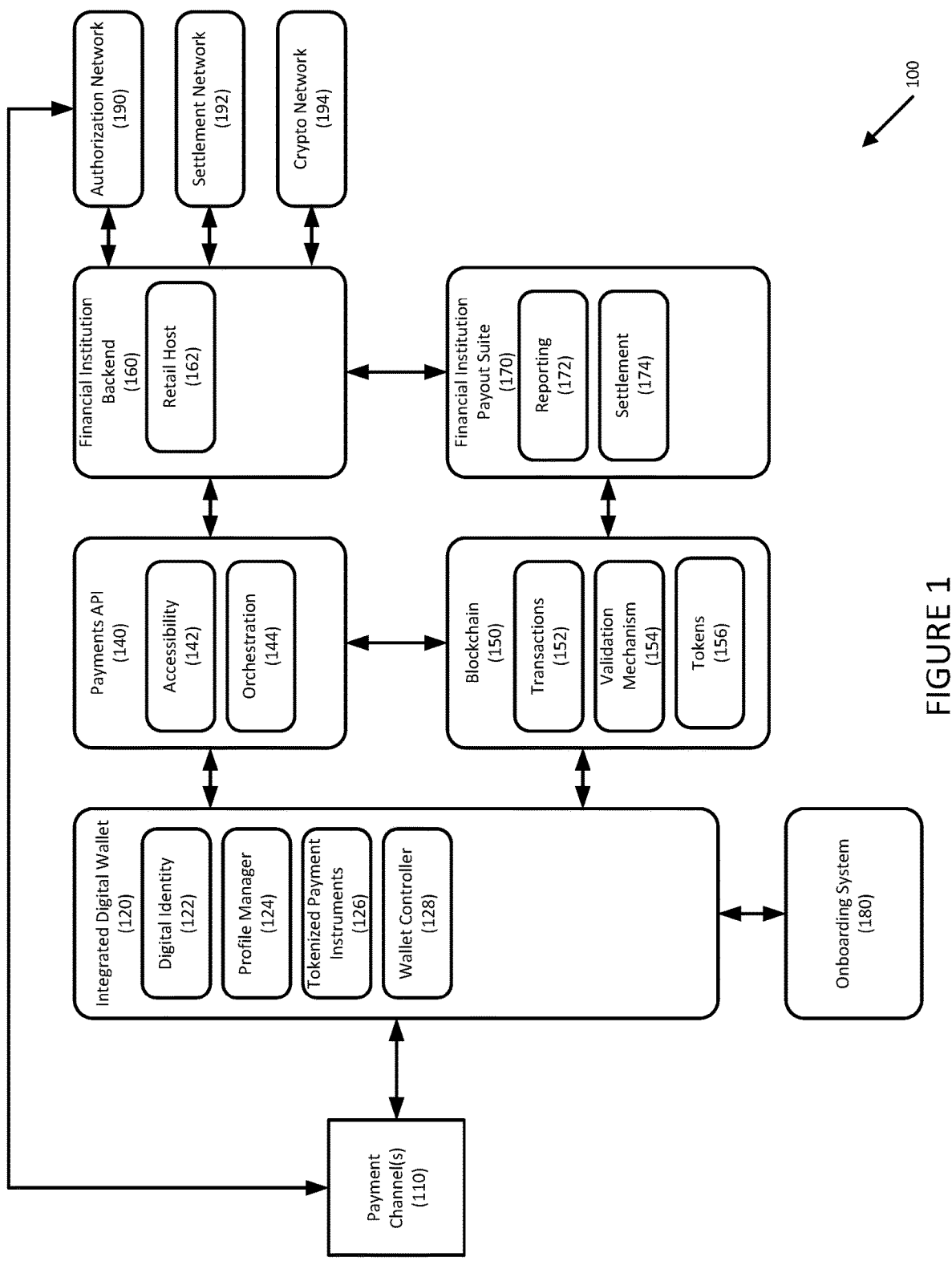
FIG. 1 depicts a system for integrated digital wallet payments according to an embodiment.

FIG. 1 depicts a system for integrated blockchain-enabled wallet payments according to an embodiment. System 100 may include one or more payment channels 110, which may include mobile payment channels, desktop payment channels, back office payment channels, e-commerce payment channels, etc. Payment channel(s) 110 may interface with integrated digital wallet 120, which may be provided on an electronic device (e.g., smart phone, computer, Internet of Things (IoT) appliances, vehicle-based systems, etc. Any other suitable device may be used as is necessary and/or desired.

Integrated digital wallet 120 may further include digital identity 122, which may be based on an identity that may be issued by an authoritative source (e.g., a government), profile manager 124, tokenized payment instruments 126 (e.g., tokenized credit cards, debit cards, crypto accounts, etc.), and wallet controller 128 that may control the operation of integrated digital wallet 120. In one embodiment, integrated digital wallet 120 may include reward or loyalty account information, which may also be tokenized.

In one embodiment, profile manager 124 may store customer preferences, trusted merchant lists, merchant payments authority (e.g., subscriptions, direct debit, authority to top-up, etc.).

System 100 may further include onboarding system 180, which may onboard a user's digital identity and/or payment instruments to integrated digital wallet 120. Onboarding may include know your customer (KYC), anti-money laundering (AML), and combatting the financing of terrorism (CFT) checks and validations. In one embodiment, onboarding system 180 may interface with financial institution backend 160 to onboard a user to the financial institution if the user is not already a customer.

Integrated digital wallet 120 may integrate with payments API 140 to conduct a payment. Payments API 140 may include software modules, such as accessibility module 142 and orchestration module 144. In one embodiment, the software modules may be cloud-based software modules. Orchestration module 144 may redirect a payment request to the next application, typically per payment method. Orchestration module 144 may also enhance the message and decide on an optimal processing route, including, for example, any additional security layers needed based on fraud screening.

Payments API 140 may provide an interface for financial institution backend 160, which may provide retail host 162 for receiving a transaction with a payment instrument from integrated digital wallet 120. In one embodiment, payments API 140 may also obtain a validated token or a transaction identifier from blockchain 150. Retail host 162 may execute the transaction using authorization network 190, settlement network 192, and/or cryptocurrency network 194, depending on the parameters of the transaction.

System 100 may include blockchain 150, which may store transactions 152 using validation mechanism 154, such as a consensus mechanism. Blockchain may be a private ledger, and transactions may be private. Blockchain 150 may also store tokens 156, which may provide a digital identifier for an individual, a business, etc.

In one embodiment, blockchain 150 may store payment instruments, digital identities, etc.

System 100 may also include financial institution payout suite 170 that may provide reporting module 172 and settlement module 174. Reporting module 172 may generate reports regarding a status of transactions, may generate postings, etc., and settlement module 174 may provide settlement services to settle transactions.

For example, once a payment from integrated digital wallet 120 is executed by financial institution backend 160, financial institution payout suite 170 may orchestrate the payout to the merchant. This increases the security, traceability, and speed of the operations. In embodiments, there may be no need to wait for the actual execution and update on-chain to proceed with next action, such as payout.

In embodiments, some or all of the elements, from the onboarding of the consumer, seller, payments or digital asset networks, to the request and processing of the transactions, including outcome and decline reasons, to the actual money movement or change of custody for the digital assets, may provide data for data analytics.

Figure 2:
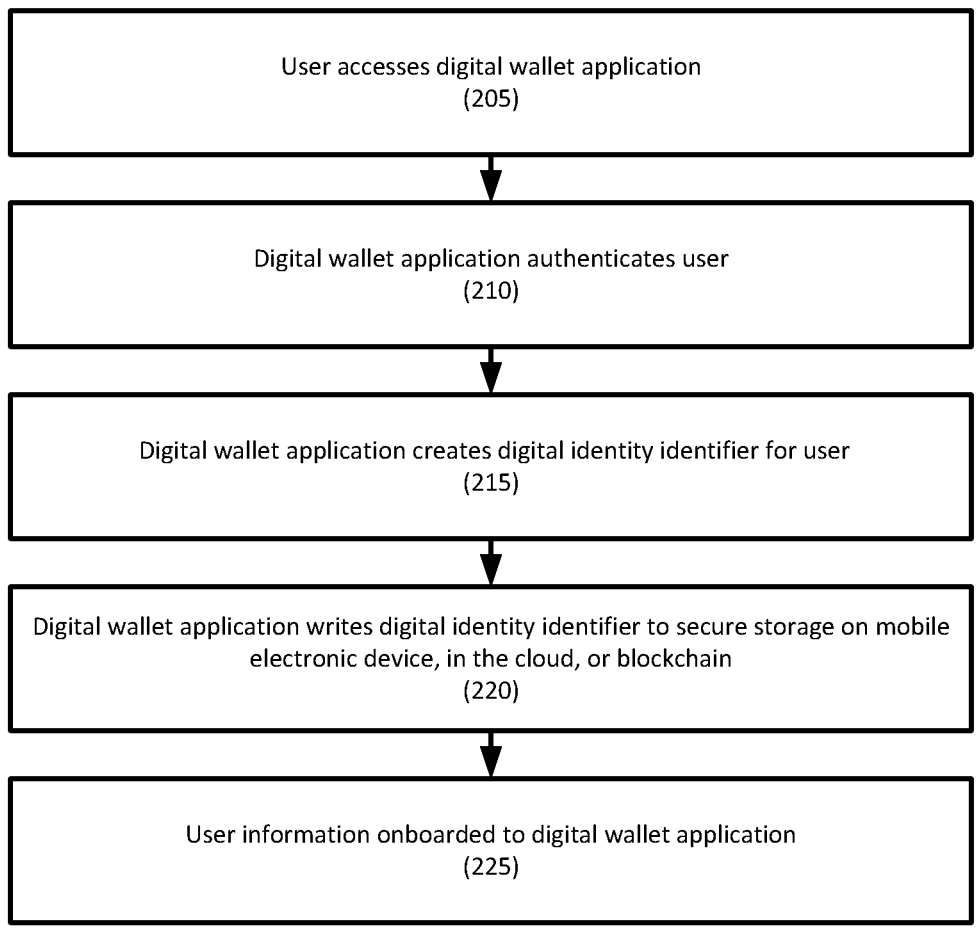
FIG. 2 depicts a method for method for registration and storage of a digital identify identifier according to an embodiment.

FIG. 2 depicts a method for registration and storage of a digital identify identifier according to an embodiment.

In step 205, a user may access a digital wallet application. The digital wallet application may be a computer application that is executed by the user's electronic device (e.g., computer, smart device, Internet of Things device, etc.).

In step 210, the digital wallet application may authenticate the user. For example, the digital wallet application may require the user to enter authentication information, such as login credentials (e.g., a username and password), provide a passcode, a personal identification number (PIN), a biometric (e.g., thumbprint, facial biometric, palm biometric, etc.), combinations thereof, etc. The digital wallet application may then authenticate the user based on the authentication information.

In step 215, if not already created, the digital wallet application may then create a digital identity identifier for the user. The digital identity may include user information (e.g., name and contact information, such as email, phone, etc.), authentication information (e.g., timestamp of authentication, authentication method, etc.). The data may then be hashed into a digital identity identifier, may be encrypted, etc.

In one embodiment, the digital identity identifier may include an attestation or similar that may be issued by an attestation-issuing authority, such as a government agency. Examples of digital identities and attestations are described in U.S. patent application Ser. No. 16/878,457, filed May 19, 2020, and U.S. Provisional Patent Application Ser. No. 62/850,181, filed May 20, 2019, U.S. Provisional Patent Application Ser. No. 62/976,262 filed Feb. 13, 2020, U.S. Provisional Patent Application Ser. No. 63/126,335 filed Dec. 16, 2020, and U.S. patent application Ser. No. 17/174,650 filed Feb. 12, 2021, the disclosures of which are hereby incorporated, by reference, in their entireties.

In one embodiment, the digital identity identifier may also include device fingerprint information for the user electronic device, such as an electronic device type and an electronic device serial number.

In step 220, the digital wallet application or a digital wallet backend may submit the digital identity identifier to a distributed ledger network, such as a blockchain-based distributed ledger network. Once approved by a validation method (e.g., a consensus mechanism or similar), the digital identity identifier may be written as a block to the distributed ledger network.

In one embodiment, the digital wallet application may receive a pointer to the digital identity identifier on the distributed ledger network.

In another embodiment, the digital wallet application may store the digital identity identifier in secure storage on the user's electronic device.

In step 225, the digital wallet may onboard user information, such as payment instrument information (e.g., credit cards, debit cards, etc.), loyalty memberships, cryptocurrency accounts, shipping addresses, etc. may be onboarded to an integrated digital wallet. In embodiments, the user information may be added to a consumer profile that may be managed by a profile manager.

In one embodiment, the user may specify or opt into an automated rules-based determination of which payment mechanism from those available in the wallet to use given a merchant type, a transaction amount, a type of transaction (e.g., one-off purchase versus recurring), etc. to optimize the transaction for the user. For example, the user may specify different conditions for each payment mechanism, or may allow the digital wallet application to select the payment mechanism using artificial intelligence, machine learning from past transactions conducted by the user and/or similar users, etc. The payment mechanism may be selected to optimize benefits for the transaction (e.g., discounts, coupons, reward point earnings, purchase protection, warranties, etc.), manage account balances, avoid fees (e.g., foreign exchange fees for international transactions, shipping fees, etc.), etc. Any suitable rules may be applied as is necessary and/or desired.

In one embodiment, if the user has not provided its preferences and has not opted into the automated rules-based determination, the digital wallet application may select a payment mechanism based on the user's geography, demography group, age, etc., or based on the payment mechanism most likely to succeed in obtaining approval.

Figure 3A:
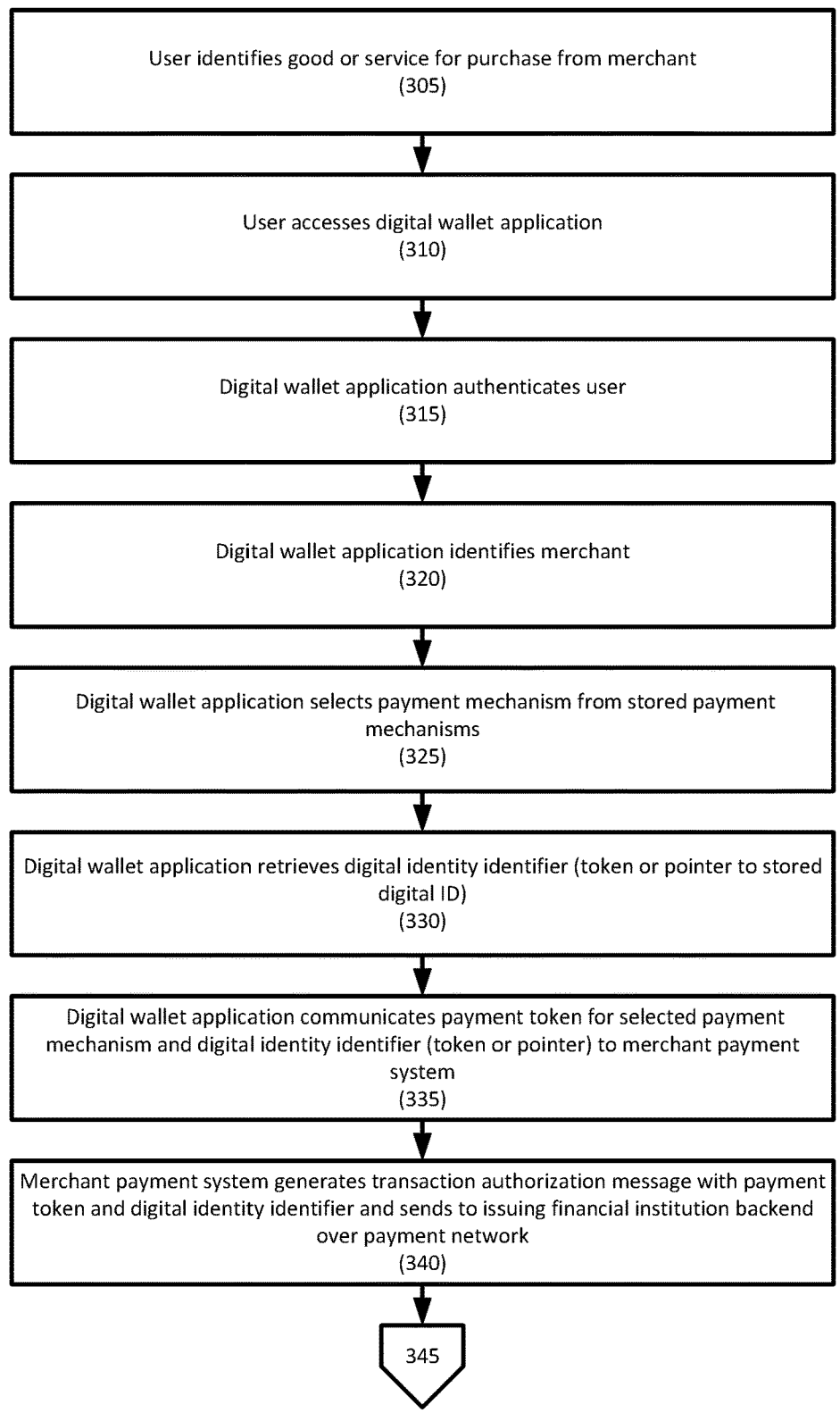
FIGS. 3A and 3B depict a method for digital wallet payments according to an embodiment.
Figure 3B:
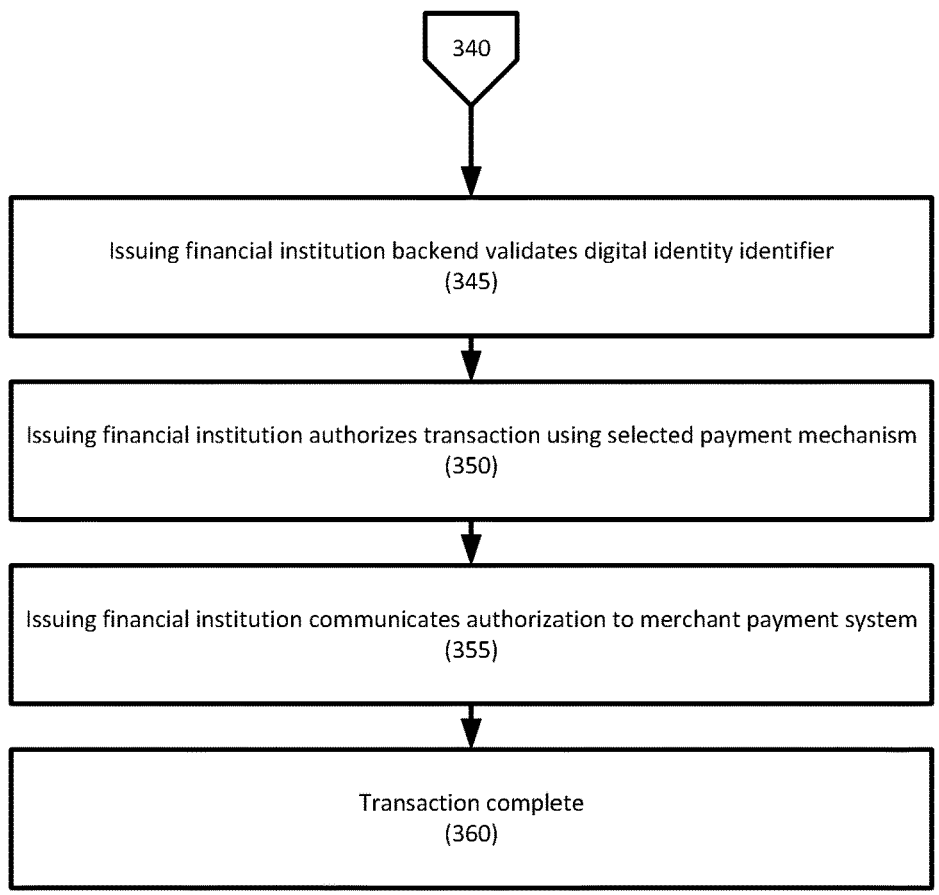

Referring to FIGS. 3A and 3B, a method for digital wallet payments is provided according to an embodiment.

In step 305, a user may identify a good or service for purchase from merchant. For example, the user may shop on-line and add goods or services to its virtual shopping cart, may shop in person and may present the goods or services to a merchant point of sale device, etc.

In step 310, the user may access a digital wallet application that is executed by the user's electronic device, and in step 315, the digital wallet may authenticate the user. For example, once the digital wallet application is opened, the digital wallet application may require the user to provide login credentials, biometrics, etc. The digital wallet application may then authenticate the user based on the input.

In step 320, if not already identified and as needed, the digital wallet application may identify the merchant. The digital wallet application may use, for example, a GPS location of the merchant, a digital beacon transmitted by the merchant, etc. In one embodiment, the digital wallet application may identify the merchant as part of the check-out process.

If the user is conducting an on-line transaction, the merchant may be identified as part of the shopping process.

In step 325, the digital wallet application may select one or more payment mechanisms from stored payment mechanisms in the digital wallet. For example, the payment mechanisms may include credit card, debit cards, demand deposit account (DDA) transfers, lines of credit, payment with reward points, cryptocurrencies, third-party payment providers, etc. In one embodiment, the digital wallet application may apply automated rules or user preferences to select one or more payment mechanisms for the transaction. As discussed above, the automated rules may be based on, for example, customer preferences, optimization of benefits for the transaction (e.g., discounts, coupons, reward point earnings, purchase protection, warranties, etc.), account balance management, etc. Any suitable rules, including machine-learning based rules and/or artificial intelligence based rules, may be applied as is necessary and/or desired.

In step 330, the digital wallet application may retrieve a digital identity identifier. In one embodiment, the digital wallet application may be stored as a token in secure storage on the user's electronic device. In another embodiment, the digital wallet application may retrieve a pointer to the digital identity identifier on, for example, a distributed ledger network.

In step 335, the digital wallet application may communicate a payment token for the selected payment mechanism and a digital identity identifier token or pointer to a digital identity identifier on a distributed ledger to a merchant payment system, such as a point-of-sale device or an online payment processing system.

In step 340, the merchant payment system may generate a transaction authorization message with the payment token and digital identity identifier token or pointer, and may send the transaction authorization message, the payment token, and digital identity identifier token or pointer to an issuing financial institution backend over a payment network (e.g., to a merchant acquirer and over a card association).

In step 345, the issuing financial institution backend may validate the digital identity identifier token or pointer. In one embodiment, the issuing financial institution backend may retrieve a stored digital identity token and may validate that the digital identity token matches the retrieved digital identity token. In another embodiment, the issuing financial institution backend may retrieve information that is included in the digital identity identifier and reconstruct the digital identity identifier and compare it to the received digital identity identifier. In still another embodiment the financial institution backend may retrieve the digital identity identifier using the pointer.

In one embodiment, the issuing financial institution backend may also verify that the digital identity identifier has not expired, been rescinded, included on a do not use list, etc.

In step 350, the issuing financial institution backend may authorize the transaction using the selected payment mechanism, and in step 355 may communicate the authorization to the merchant payment system.

In step 360, the merchant payment system may complete the transaction.

In one embodiment, if the payment mechanism was selected by the user, the selection may be used to train a machine learning engine to predict a payment mechanism for a future transaction.

Figure 4A:
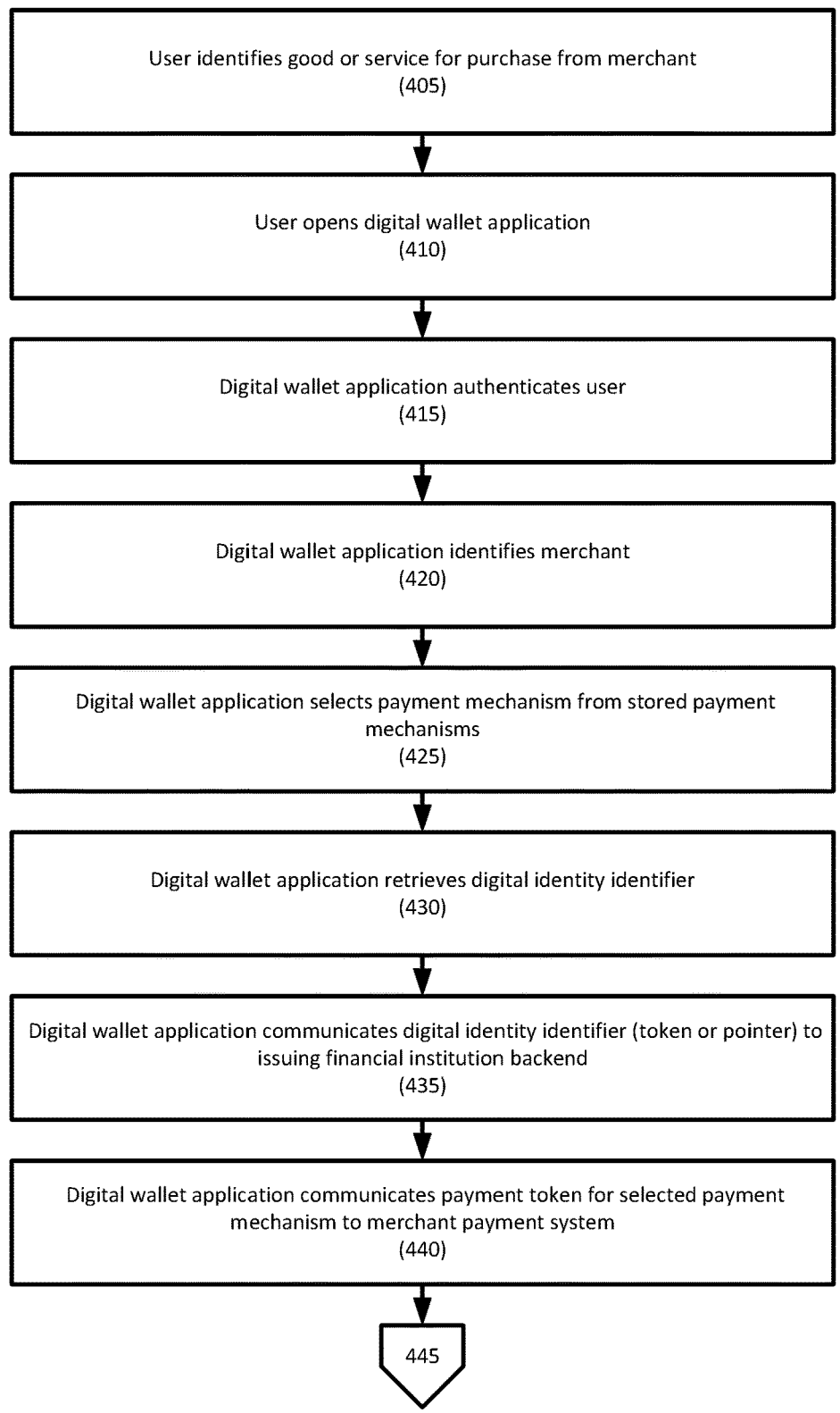
FIGS. 4A and 4B depict a method for digital wallet payments according to an embodiment.
Figure 4B:
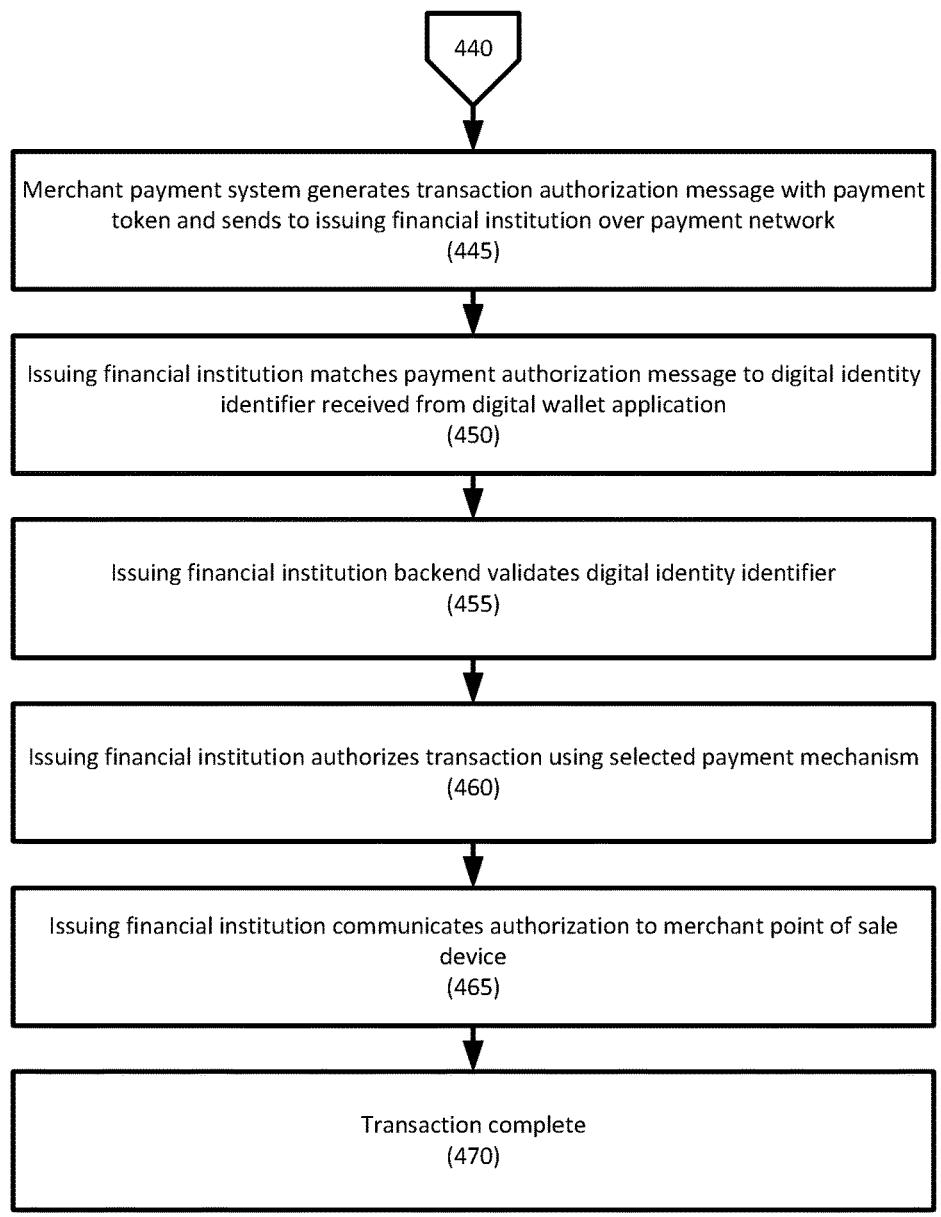

Referring to FIGS. 4A and 4B, a method for digital wallet payments is provided according to another embodiment.

In step 405, a user may identify a good or service for purchase from merchant. This may be similar to step 305, above.

In step 410, the user may access a digital wallet application that is executed by the user's electronic device, and in step 415, the digital wallet may authenticate the user. These may be similar to steps 310 and 315, respectively, above.

In step 420, if not already identified and as needed, the digital wallet application may identify the merchant. This may be similar to step 320, above.

In step 425, the digital wallet application may select one or more payment mechanisms from stored payment mechanisms in the digital wallet. This may be similar to step 325, above.

In step 430, the digital wallet application may retrieve a digital identity identifier. This may be similar to step 330, above.

In step 435, the digital wallet application may communicate a digital identity identifier token or pointer to a digital identity identifier on a distributed ledger to an issuing financial institution backend.

In step 440, the digital wallet application may communicate a payment token for the selected payment mechanism to a merchant payment system, such as a merchant point-of-sale device or a merchant online payment processing system.

In step 445, the merchant payment system may generate a transaction authorization message with the payment token and may send the transaction authorization message and the payment token to the issuing financial institution backend over a payment network (e.g., to a merchant acquirer and over a card association).

In step 450, the issuing financial institution backend may match the payment authorization message to the digital identity identifier token or pointer received from the digital wallet application. In step 455, it may then validate the digital identity identifier token or pointer. This may be similar to step 335, above.

In step 460, the issuing financial institution backend may authorize the transaction using the selected payment mechanism, and in step 465 may communicate the authorization to the merchant payment system.

In step 470, the merchant payment system may complete the transaction.

In one embodiment, if the payment mechanism was selected by the user, the selection may be used to train a machine learning engine to predict a payment mechanism for a future transaction.

Figure 5:
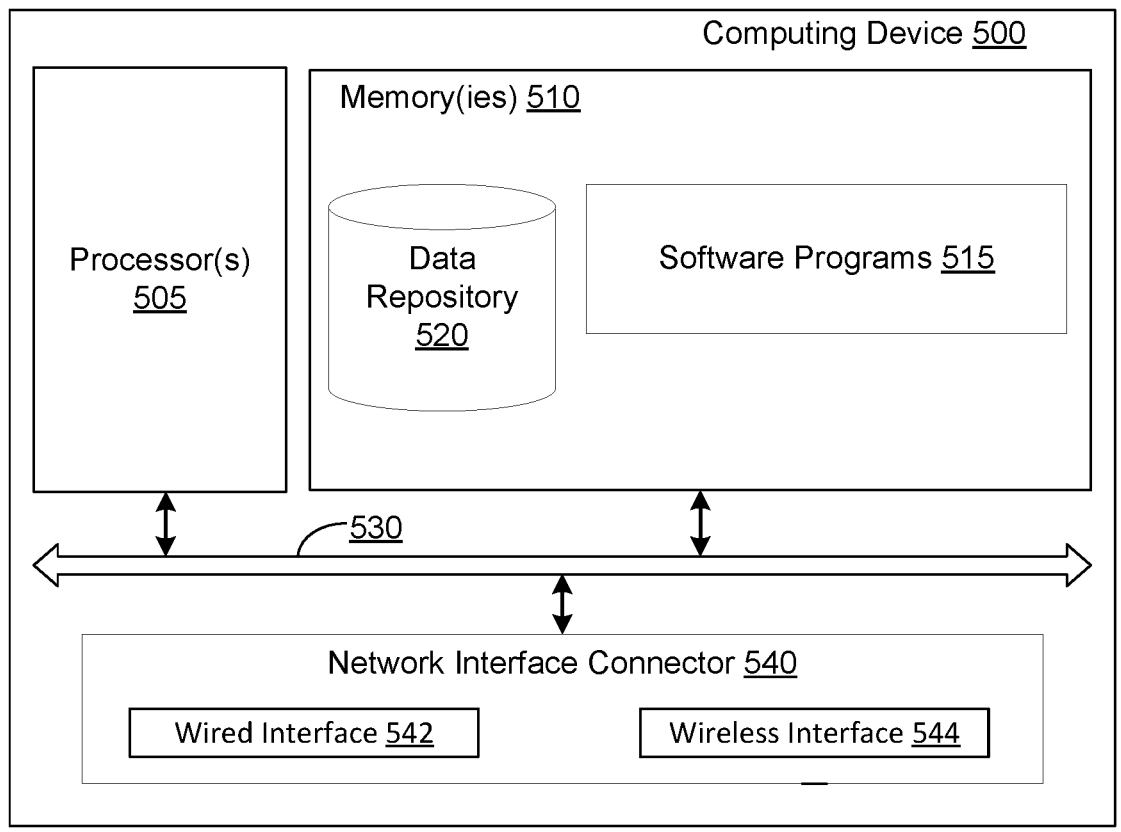
FIG. 5 depicts an exemplary computing system for implementing aspects of the present disclosure.

FIG. 5 depicts an exemplary computing system for implementing aspects of the present disclosure. FIG. 5 depicts exemplary computing device 500 that may represent the system components described herein. Computing device 500 may include processor 505 that may be coupled to memory 510. Memory 510 may include volatile memory. Processor 505 may execute computer-executable program code stored in memory 510, such as software programs 515. Software programs 515 may include one or more of the logical steps disclosed herein as a programmatic instruction, which may be executed by processor 505. Memory 510 may also include data repository 520, which may be nonvolatile memory for data persistence. Processor 505 and memory 510 may be coupled by bus 530. Bus 530 may also be coupled to one or more network interface connectors 540, such as wired network interface 542 or wireless network interface 544. Computing device 500 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for digital wallet payments, comprising:
   receiving, by a digital wallet application executed by a user electronic device, a selection of a good or service offered by a merchant;
   receiving, by the digital wallet application, authentication information from a user;
   authenticating, by the digital wallet application, the authentication information;
   selecting, by the digital wallet application, a payment mechanism out of a plurality of payment mechanisms onboarded to the digital wallet application;
   retrieving, by the digital wallet application, a pointer to a digital identity identifier that is stored on a distributed ledger in a distributed ledger network, wherein the digital identity identifier is issued by an attestation-issuing authority and comprises an attestation from the attestation-issuing authority, wherein the attestation attests to the identity of the user;
   communicating, by the digital wallet application, a payment token for the selected payment mechanism and the pointer to the digital identity identifier on the distributed ledger to a merchant payment system, wherein the merchant payment system is configured to generate a transaction authorization message and to communicate the transaction authorization message, the payment token, and the pointer to the digital identity identifier to an issuing financial institution backend over a payment network;
   receiving, by the issuing financial institution backend, the transaction authorization message, the payment token, and the pointer to the digital identity identifier;
   accessing, by the issuing financial institution backend, the distributed ledger at the pointer;

validating, by the issuing financial institution backend, that the attestation at the pointer on the distributed ledger has not expired or been rescinded;

in response to successfully validating the attestation, authorizing, by the issuing financial institution backend, the transaction authorization message; and communicating, by the issuing financial institution, authorization to the merchant payment system.

2. The method of claim 1, wherein the authentication information comprises a login credential, a passcode, a personal identification number, and/or biometric.

3. The method of claim 1, wherein the digital identity identifier comprises user information for the user, the authentication information, and/or an attestation issued by an attestation issuing authority.

4. The method of claim 3, wherein the user information comprises a user name and user contact information for the user.

5. The method of claim 1, wherein the digital wallet application selects the payment mechanism based on a merchant type, a transaction amount, and a type of transaction.

6. The method of claim 1, wherein the issuing financial institution backend validates the pointer to the digital identity identifier by retrieving a stored digital identity identifier from the distributed ledger and comparing the digital identity identifier to a stored digital identity identifier.

7. A method for digital wallet payments, comprising:

receiving, by a digital wallet application executed by a user electronic device, a selection of a good or service offered by a merchant;

receiving, by the digital wallet application, authentication information from a user;

authenticating, by the digital wallet application, the authentication information;

selecting, by the digital wallet application, a payment mechanism out of a plurality of payment mechanisms onboarded to the digital wallet application;

retrieving, by the digital wallet application, a digital identity identifier token that is stored in secure storage of the user electronic device, wherein the digital identity identifier token is issued by an attestation-issuing authority and comprises an attestation from the attestation-issuing authority, wherein the digital identity identifier token attests to the identity of the user;

communicating, by the digital wallet application, a payment token for the selected payment mechanism and the digital identity identifier token to a merchant payment system, wherein the merchant payment system is configured to generate a transaction authorization message and to communicate the transaction authorization message, the payment token, and the digital identity identifier token to an issuing financial institution backend over a payment network;

receiving, by the issuing financial institution backend, the transaction authorization message, the payment token, and the digital identity identifier token;

validating, by the issuing financial institution backend, that the digital identity identifier token has not expired or been rescinded;

in response to successfully validating the digital identity identifier token, authorizing, by the issuing financial institution backend, the transaction authorization message; and communicating, by the issuing financial institution, authorization to the merchant payment system.

8. The method of claim 7, wherein the authentication information comprises a login credential, a passcode, a personal identification number, and/or biometric.

9. The method of claim 7, wherein the digital identity identifier comprises user information for the user, the authentication information, and/or an attestation issued by an attestation issuing authority.

10. The method of claim 9, wherein the user information comprises a user name and user contact information for the user.

11. The method of claim 9, wherein the digital wallet application selects the payment mechanism based on a merchant type, a transaction amount, and a type of transaction.

12. The method of claim 7, wherein the issuing financial institution backend validates the digital identity identifier token by retrieving a stored digital identity token and comparing the digital identity identifier token to a stored digital identity identifier token.

* * * * *